US006237030B1

(12) United States Patent
Adams et al.

(10) Patent No.: US 6,237,030 B1
(45) Date of Patent: *May 22, 2001

(54) METHOD FOR EXTRACTING HYPERLINKS FROM A DISPLAY DOCUMENT AND AUTOMATICALLY RETRIEVING AND DISPLAYING MULTIPLE SUBORDINATE DOCUMENTS OF THE DISPLAY DOCUMENT

(75) Inventors: David Michael Adams, Round Rock; John Maddalozzo, Jr., Austin; Gerald Francis McBrearty, Austin; Johnny Meng Han Shieh, Austin, all of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,954

(22) Filed: Jun. 30, 1998

(51) Int. Cl.[7] .............................. G06F 15/57; G06F 13/38
(52) U.S. Cl. ........................................... 709/218; 709/219
(58) Field of Search .................... 709/218, 219, 709/224, 227, 245; 707/10, 501, 513; 345/354

(56) References Cited

U.S. PATENT DOCUMENTS

| 5,021,989 | * | 6/1991 | Fufisawa et al. | 364/900 |
|---|---|---|---|---|
| 5,742,768 | * | 4/1998 | Gennaro et al. | 709/203 |
| 5,781,739 | * | 7/1998 | Bach et al. | 709/227 |
| 5,799,151 | * | 8/1998 | Hoffer | 709/204 |
| 5,867,651 | * | 2/1999 | Dan et al. | 709/203 |
| 5,908,469 | * | 6/1999 | Botz et al. | 713/201 |
| 5,933,140 | * | 8/1999 | Strahorn et al. | 345/338 |
| 5,933,142 | * | 8/1999 | LaStrange et al. | 345/340 |
| 5,956,737 | * | 9/1999 | King et al. | 707/517 |
| 5,959,623 | * | 9/1999 | Van Hoff et al. | 345/333 |
| 5,978,836 | * | 11/1999 | Ouchi | 709/206 |
| 5,983,369 | * | 11/1999 | Bakoglu et al. | 714/46 |
| 6,003,032 | * | 12/1999 | Bonney et al. | 707/10 |
| 6,006,252 | * | 12/1999 | Wolfe | 709/203 |
| 6,011,537 | * | 1/2000 | Slotznick | 345/115 |
| 6,012,090 | * | 1/2000 | Chung et al. | 709/219 |
| 6,016,494 | * | 1/2000 | Isansee et al. | 707/102 |

(List continued on next page.)

FOREIGN PATENT DOCUMENTS

| 0 818 742 A1 | 1/1998 | (EP) . |
|---|---|---|
| 07282079 | 10/1995 | (JP) . |
| WO 97/49044 | 12/1997 | (WO) . |
| WO 98/20434 | 5/1998 | (WO) . |

OTHER PUBLICATIONS

Goodman, Macromedia Dreamweaver, Computer shopper, v18, n8, 4 pages, Aug. 1998.*

(List continued on next page.)

*Primary Examiner*—Le Hien Luu
*Assistant Examiner*—Bunjob Jaroenchonwanit
(74) *Attorney, Agent, or Firm*—Volel Emile; Felsman, Bradley, Vaden, Gunter & Dillon, LLP

(57) ABSTRACT

An improved method for viewing a plurality of network locations in response to a single user input utilizing a computer network. A plurality of network locations are assigned to a predetermined group selectable from a single graphic user interface button. In response to a single user input, data is retrieved which is associated with the predetermined group of network locations. Data is displayed from the predetermining group of location contemporaneously, wherein a user can efficiently view data associated with the assigned plurality of network locations concurrently in response to the single user input.

18 Claims, 8 Drawing Sheets

U.S. PATENT DOCUMENTS

| | | | | |
|---|---|---|---|---|
| 6,023,722 | * | 2/2000 | Colyer | 709/201 |
| 6,025,837 | * | 2/2000 | Matthews, III et al. | 345/327 |
| 6,028,601 | * | 2/2000 | Machiraju et al. | 345/336 |
| 6,081,263 | * | 6/2000 | LeGull et al. | 345/327 |

OTHER PUBLICATIONS

U.S. Pat. application No. 09/080,020; Title: *Method for Parallel Selection of URL's*; M. Himmel, et al.; Attorney Docket No. AT9-98-097; filed May 15, 1998.

M. Chambers, K. Rodden, D. Brodbeck: "The order of things: activity–centered information access," 1998, pp. 359–367, Computer Networks and ISDN Systems 30; Elsevier Science B.V.

S.J. Carriére, R. Kazman: "WebQuery: searching and visualizing the Web through connectivity," 1997, pp. 1257–1267, Computer Networks and ISDEN Systems; Elsevier Science B.V.

* cited by examiner

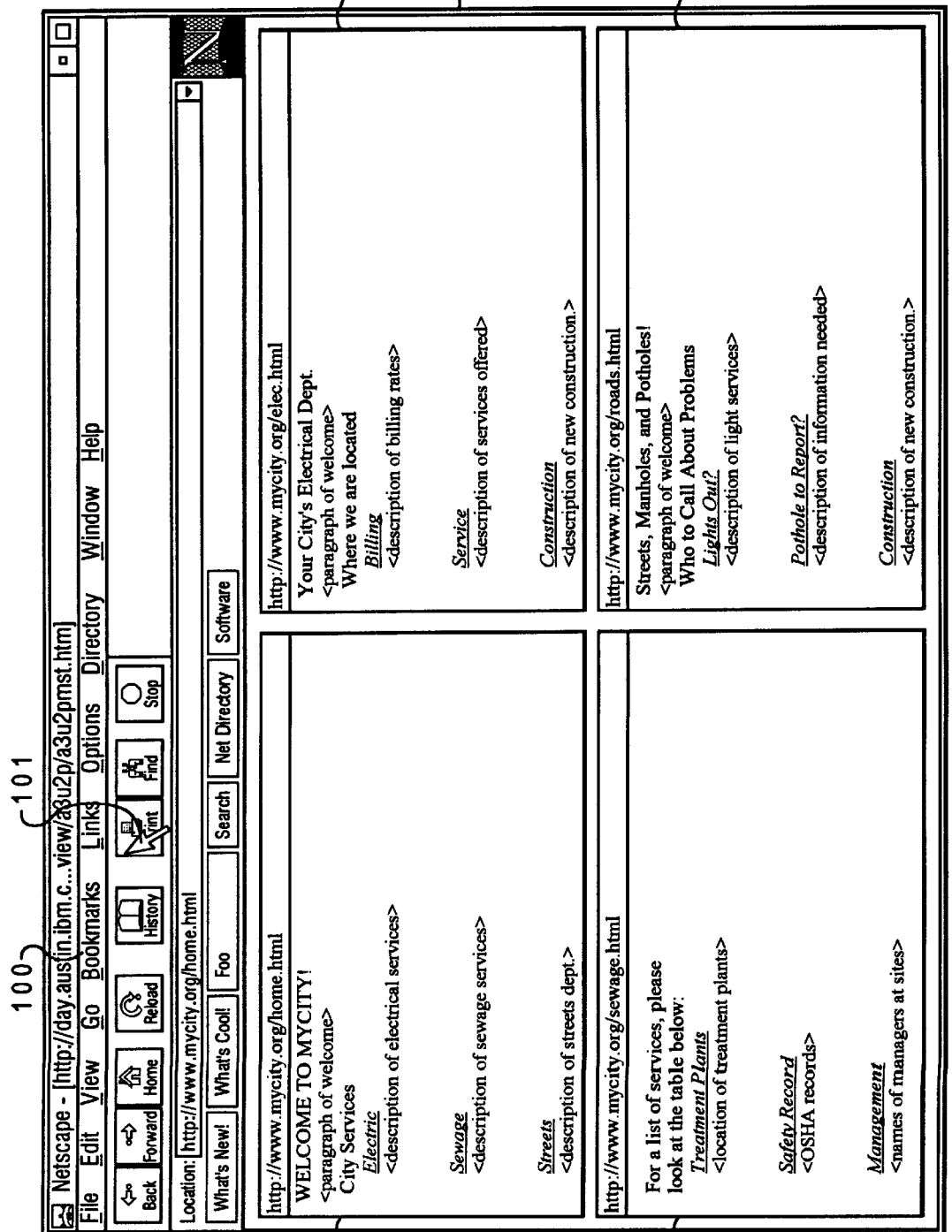

METHOD FOR EXTRACTING HYPERLINKS FROM A DISPLAY DOCUMENT AND AUTOMATICALLY RETRIEVING AND DISPLAYING MULTIPLE SUBORDINATE DOCUMENTS OF THE DISPLAY DOCUMENT

BACKGROUND OF THE INVENTION

1. Technical Field

The present invention relates in general to an improved method for viewing a plurality of network locations concurrently, and in particular to a method and system for retrieving and displaying a plurality of network locations in response to a single user input. Still more particularly, the present invention relates to a method and system for specifying a predetermined group of network locations automatically and contemporaneously displaying the predetermined group in response to a single user input.

2. Description of the Related Art

The development of computerized information resources, such as interconnection of remote computer networks, allows users of data processing systems to link with other "servers" and networks, and thus retrieve vast amounts of electronic information heretofore unavailable in an electronic medium. A server provides interconnection among communicating networks. Such electronic information is increasingly displacing more conventional means of information transmission such as newspapers, magazines, and even television. Often, users desire quick access to specific information on a reoccurring basis. It is therefore desirable to maximize efficiency and minimize complexity when retrieving information from predetermined locations utilizing a computer.

In computer communications, a set of computer networks which are possibly dissimilar from one another are joined together by "gateways". Gateways provide data transfer and conversion of messages from the sending network to the protocols and data type utilized by the receiving network. A gateway is a device utilized to connect dissimilar networks, or networks utilizing different communication protocols, such that electronic information utilizing different standards can be processed and transmitted from network to network. Gateways convert information to a form compatible with the protocols utilized by other networks for transport and delivery.

One type of remote network commonly utilized in recent years is the Internet. The term "Internet" is an abbreviation for "Internetwork," and is commonly utilized to describe the collection of networks and gateways which are compatible with the TCP/IP suite of protocols. TCP/IP protocols are well-known in the art of computer networking. TCP/IP is an acronym for "Transmission Control Protocol/Internet Protocol," a software protocol developed by the Department of Defense for communication between computers.

The Internet can be described as a system of geographically distributed remote computer networks interconnected by computers which provide an interface that allow users to interact and share information over the networks. Because of such wide-spread information sharing, remote networks such as the Internet have thus far generally evolved into an "extensive" system which developers can provide information or services essentially without restriction.

Electronic information transferred between data processing networks is usually presented in "hypertext", a metaphor for presenting information in a manner in which text, images, sounds, and actions become linked together in a complex non-sequential "web" of associations. The web of associates permit a user to "browse" or "navigate" through related topics, regardless of the presented order of the topics. Such links are often established by both the author of a hypertext document, and by the user depending on the intent of the hypertext document.

For example, traveling among links to the word "iron" in an article displayed within a graphical user interface, in a data processing system, might lead the user to the periodic table of the chemical elements (i.e., linked by the word "iron"), or to a reference to the utilization of iron in weapons in Europe in the Dark Ages.

The term "hypertext" was coined in the 1960s to describe documents, as presented by a computer, that express the nonlinear structure of ideas, as opposed to the linear format of books, film, and speech. The term "hypermedia," on the other hand, more recently introduced, is nearly synonymous with "hypertext," but focuses on the non-textual components of hypertext, such as animation, recorded sound, and video.

A typical networked system which utilizes hypertext and hypermedia conventions follows a client/server architecture. The "client" is a member of a class or group that utilizes the services of another class or group to which it is not related. Thus, in computing, a client is a process (i.e., roughly a program or task) that requests a service provided by another program active in a "server". The client process utilizes the requested service without having to "know" any working details about the other program or the service itself. In a client/server architecture, particularly a networked system, a client is usually a computer that accesses shared network resources provided by a server (i.e., another computer).

A request for information by a user is sent by a client application program to a server. A server is typically a remote computer system accessible over a remote network, such as the Internet. The server scans and searches for raw (e.g., unprocessed) information sources, for example, newswire feeds or newsgroups. Based upon the user's request, the server presents filtered electronic information as a server response to the client process.

The client process may be active in a first computer system, and the server process may be active in a second computer system. The client and server communicate with one another over a communications medium, thus providing distributed functionality and allowing multiple clients to take advantage of the information-gathering capabilities of a single server.

Free or relatively inexpensive computer software applications such as Internet "search engines," allow a user to locate sites where an individual can obtain information on a topic of interest. A person utilizing a graphical user interface of a computer system may enter a subject or key word which generates a list of network sites or "web sites". "Home pages" or title pages for a web site are published by thousands of companies, universities, government agencies, museums, and municipalities. Thus, the Internet can be an invaluable information resource.

A client and server can communicate with one another utilizing the functionality provided by Hypertext-Transfer Protocol (HTTP). The World Wide Web (WWW) or, simply, the "web," includes those servers adhering to the HTTP standard, such servers are accessible to clients via a computer or data-processing system network address, such as a Universal Resource Locator (URL). A network location can be directly accessed by utilizing a Universal Resource Locator address.

Active within the client is a first process, known as a "browser," which establishes the connection between the client and the server and presents information to the user on a graphical user interface. The server itself executes corresponding server software which presents information to the client in the form of HTTP responses. The HTTP responses correspond to "web pages" constructed from a Hypertext Markup Language (HTML), or other server-generated data. A client and a server may be coupled to one another via a Serial Line Internet Protocol (SLIP) or a TCP/IP connection for high-capacity communication.

Generally a client displays a browser and data received from the network is displayed via a graphical user interface. A graphical user interface is a type of display format that enables a user to choose commands, start programs, and see lists of files and other options by pointing to pictorial representations (icons or selectable buttons) and/or lists of menu items on the display. User selections are generally activated either with a keyboard or a mouse.

A graphical user interface (GUI) can be employed by a user to start processes, view file content and to select tools. Additionally, a GUI allows a user to command many selectable tools by pointing to a desired selection and depressing a push button typically utilizing a mouse. A desired selection might be a textual reference, a toolbar button, or a selection from a list of menu items on a computer display screen.

A user selectable choice can generally be activated by either a keyboard or a push button switch located on a pointing device such as a "mouse". A mouse is a commonly utilized pointing device, generally containing more than one button. A pointing device allows a user to interact with a product or operating environment, such as a graphical user interface. In many graphical user interfaces, a vertical or horizontal bar at the side, bottom or top of a graphical user interface window can be utilized in conjunction with a pointing device such as a mouse, trackball, or stylus to quickly select features of the application program.

Additional vertical and horizontal bars may contain "selectable buttons." Selectable buttons are commonly called "icons" by those familiar with graphical user interfaces. An icon is a selectable button viewable within a graphical user interface, typically containing a pictorial representation or a mnemonic representative of a selectable feature.

Generally, the pictorial representation contained within an icon is a graphic symbol allowing a user to associate an icon with a particular selectable function. An icon can be selected by pointing to the icon utilizing a pointing device and activating a push-button on the mouse when the icon is pointed to. Pointing to a selection and depressing a mouse button is commonly referred to by those having skill in the art as "pointing and clicking" on the icon or on the menu item. Pointing and clicking is a user friendly way to select a particular function or software application. Generally, an icon contains a visual mnemonic which allows a user to identify a selection without having to remember commands or type in commands utilizing a keyboard as is required in a disk operating system (DOS) environment.

Horizontal or vertical bars containing textual menu category headings are commonly referred to as menu bars. Horizontal or vertical bars containing icons are commonly referred to as toolbars. Toolbars are a well known part of graphical user interfaces which simplifies access to files and allows the user to perform complicated system commands by pointing and clicking on a selectable item within the graphical user interface. Toolbar selectable user commands provide efficient interface between the user and a computer system. Often, user selectable commands located on a toolbar are duplicated in the menu bar.

It is easier and more efficient to activate selections within a toolbar than to locate and select menu headings and corresponding menu items. Menu items and sub-menu items are not continuously displayed and a menu heading must be selected to view a list of menu items contained under the menu heading.

It is often difficult for a user to locate desirable information resources, or web pages and locating a pertinent resource can consume a substantial amount of time. Locating an information resource is typically done by keyword searching. Keyword searching is accomplished when a user provides a keyword and instructs the client via a server to search for information resources having the keyword or information resources linked to the keyword. Typically, the user receives voluminous information from the Internet when a keyword search is performed. A single retrieval can provide links to a considerable quantity of web sites. Next, the user must sort through the received information for desirable data.

Web pages or network locations can also be accessed by a client which specifies a unique network address (i.e., Universal Resource Locator or URL). A Universal Resource Locator has two basic components, the protocol to be utilized and the object pathname. For example, the Universal Resource Locator address, "http://www.uspto.gov" is the home page for the U.S. Patent and Trademark Office. This address specifies a hypertext-transfer protocol ("http") and a pathname of the server ("www.uspto.gov"). The server name is associated with a unique numeric value (TCP/IP address).

The graphical portion of the World Wide Web itself is usually stocked with more than twenty-two million "pages" of content, with over one million new pages added every month. With a little practice, a user can skim millions of web pages or thousands of newsgroups, not only for topics of general interest, but also to access desirable and meaningful data. However, locating and scanning web pages can consume hours and hours of a users time. The market for Internet access and related applications is explosive and utilization of the Internet is growing faster than expected, doubling in size approximately every three months. Because of the growth of the "Internet" and the so-called "World Wide Web" in recent years, the amount of data which must be screened to get desirable data is overwhelming.

In order to avoid the inefficiencies of relocating a resource after it is has been initially located, a "bookmark" "favorite" or "hotlist" function is typically offered as part of the graphical user interface within a web browser application program. Generally, a bookmark is a universal resource locator address which is stored by the browser. When a bookmark is selected, the corresponding URL address is sent to a server by a client, then the desired location is accessed and corresponding information is retrieved efficiently with minimal user input and effort.

A typical user stores a considerable quantity of bookmark locations. However, limited space is available on the computer display to display bookmarks. Typically, a user places bookmark locations in folders, which reside in menus and sub-menus. Locating bookmarks in folders menus and/or sub-menus complicates bookmark access.

Often, a particular network location or web page of interest has "links" displayed. Links or linked keywords provide a quick and efficient access to other web pages which having information related to the highlighted keyword. Typically, the link displayed provides a URL address which resides in hidden text within the displayed web page.

When a user points and clicks on a displayed link, a browser will retrieve the hidden URL address and then directly access the web page associated with the displayed link utilizing the URL found in the hidden text.

Typically, links within a web page provide quick access to identical or related subject matter. Selecting and retrieving a linked web page allows fast and efficient examination of the linked subject matter for relevance. Browsing through many web pages and bookmarking web pages of interest is a highly desirable feature. However, when a session of browsing by a user is complete, the web pages accessed and bookmarked reside in random order or unorganized fashion in the pulldown bookmark menu.

Often, when a user locates a web page which is useful, the web page will have many links to other web pages having similar subject matter. Typically, a user will desire to visit all of the links provided. Selecting a link utilizing a pointing device will display the web page associated with the selected link. However, when a plurality of links are available the process of visiting all of the linked web sites for relevancy is inefficient. It is time consuming for a user to select a link, determine that the linked web page is not relevant and then select another link.

In a typical browser the user can select a "go back" or "backwards" feature to return to the initial web page. However, after repeated selection of links and go back commands a user can lose track of which links have been accessed and which links have not been visited.

A user can bookmark network locations but trying to revisit the related bookmarks created through visiting linked web pages and having a common theme of subject matter is very difficult.

Currently, to add to a bookmark or hotlist a user displays a web page and selects the menu item entitled bookmark or hotlist. The graphical user interface displays a pulldown menu in response to the click and a list containing folders or URLs is displayed, then the user clicks on the add to bookmark selection and the network address of the presently displayed data is loaded into the bookmark pulldown menu.

It would be preferred to allowed a user to efficiently preview a plurality of web sites to determine the web sites relevance to the users interest. This would allow a user to efficiently organize and store linked web sites such that access to a group of desirable the web sites can be quick and immediate. Proficient management of related web sites for immediate information gathering would be advantageous.

For example, an investor in the stock market might desire to visit a group of informational web sites on a daily basis to review changes to those pages. An investor might want to visit an investors advisory network location, a network location having information on how foreign markets closed and another network location having comments made by the Federal Reserve Chairman.

Currently, a user must manually retrieve each page and sequentially down load and view the data. For some users it is desirable to retrieve all desired pages and concurrently view the pages for content or relevancy.

A typical browser displays only a single web page. However, a display has the resolution to display at least four web pages concurrently with legible resolution.

The established method of displaying one web page at a time requires a user to go back and forth between web pages. Many browsers provide a selectable button on the graphical user interface called "forward and "backward" or "go back". These selectable features allow a rotation of the retrieved pages to the display. However, a user does always not know what will be displayed in response to selection of the "forward" and "go back" command.

Alternately, most graphical user interfaces allow adjustment of the size of sub-windows. This allows a user to enlarge a window or shrink a window. Thus, a user can enlarge sub-windows desired for viewing and shrink sub-windows not currently being viewed by the user. In a Microsoft™ windowing environment the menu items minimize and maximize are available to provide this feature.

Manually accessing multiple web sites and waiting for each download, then rotating through active sub-windows or minimizing and maximizing screen sizes is an inefficient and tedious method of viewing multiple web pages. To simplify a daily routine of accessing multiple web sites, it would be desirable to place several network addresses into a folder with a common title for efficient access. An automated system for quickly and directly retrieving linked web pages would also be highly desirable.

To select multiple network locations within a bookmark requires tedious interaction with the computer. Selection of multiple bookmarked locations requires manually selecting the bookmark menu heading and traversing the pulldown menu associated with the bookmark menu heading with the mouse button depressed and select a menu item in the pulldown menu, such as a folder. Next, the folder must be selected and opened, and finally a URL address or bookmark must be selected.

With known graphical user interfaces, each time a folder which is listed under a menu heading in a sub-menu requires selection, user precision is required to highlight the menu heading, traverse the newly displayed sub-menu items while keeping the mouse button depressed, and then releasing the mouse button or double clicking the mouse button on the desired selection. A computer operator is required to perform abrupt changes in the motion of the mouse in coordination with a mouse button to select a concealed menu item that resides within a folder. During menu item selection, a user cannot be clumsy or inattentive, because a menu item selection might be made which was not desired.

A sub-menu item is typically less than quarter of an inch in height on a typical display or monitor. Therefore, substantial dexterity is required to traverse menus and select desired menu items utilizing a pointing device, further coordinated with mouse button activation to move bookmarks to common folders. Erroneous menu selections results when a user over-shoots his intended menu item selection by only a fraction of an inch.

To access multiple web sites requires repeating the above interaction repeatedly for each network location. Minimal user input would be desirable to efficiently access multiple network locations. A user friendly interface for accessing associated bookmarks concurrently would provide a user friendly interface.

Based on the foregoing, it can be seen that a need exists for fast and efficient retrieval of data from a group of predetermined web sites. It would therefore be desirable to devise a method of minimal complexity which allows users to efficiently command a computer to classify or group web sites for group access. It would be further advantageous to devise a method to allow a user to manage a list of linked network locations such that the user can re-access the predetermined group of network locations utilizing a single user input. Additionally, it would be advantageous if the method would retain current toolbar behavior, but extend user functionality and decrease visual complexity.

SUMMARY OF THE INVENTION

It is therefore one object of the present invention to provide an improved method for viewing a plurality of network locations concurrently.

It is another object of the present invention to provide a method and system for retrieving and displaying a plurality of network locations in response to a single user input.

It is yet another object of the present invention to provide a method and system for specifying a predetermined group of network locations automatically and contemporaneously displaying the predetermined group in response to a single user input.

The foregoing objects are achieved as is now described. An improved method is provided for viewing a plurality of network locations in response to a single user input utilizing a computer network. A plurality of network locations are assigned to a predetermined group selectable from a single graphic user interface button. In response to a single user input, data is retrieved which is associated with the predetermined group of network locations. Data is displayed from the predetermining group of location contemporaneously, wherein a user can efficiently view data associated with the assigned plurality of network locations concurrently in response to the single user input.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 depicts an exemplary web browser window displaying multiple network locations concurrently in accordance with the present invention.

DETAILED DESCRIPTION OF ILLUSTRATIVE EMBODIMENT

Figure 1:
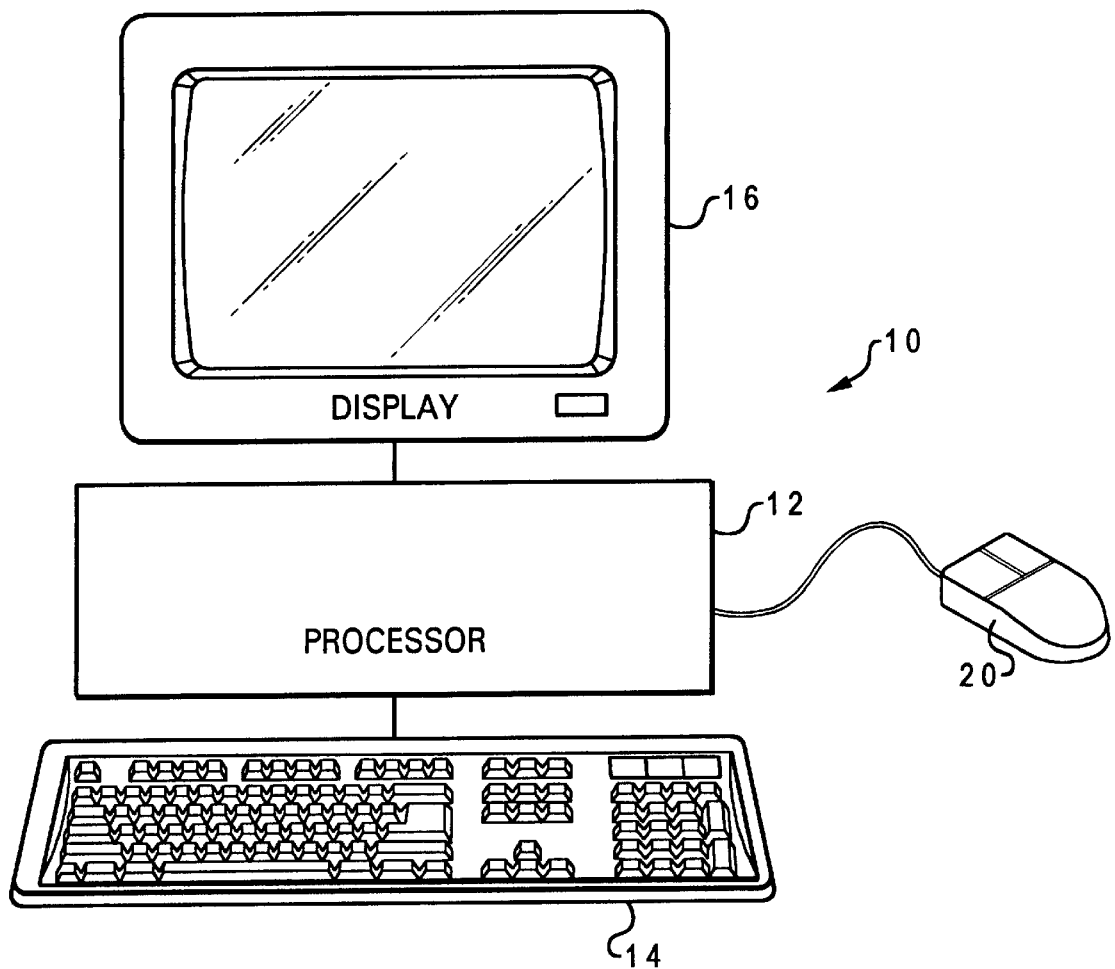
FIG. 1 is a pictorial representation of a data processing system which may be utilized to implement the method and system of the present invention.

With reference now to the figures and in particular with reference to FIG. 1, there is depicted a pictorial representation of a data-processing system in which a preferred embodiment of the present invention may be implemented. A computer 10 is depicted which includes a system unit 12, video display terminal 16, alphanumeric input device (i.e., keyboard 14) having alphanumeric and other keys, and mouse 20. An additional input device (not shown), such as a trackball or stylus, (not shown) also can be included with computer 10.

Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data processing systems, such as intelligent workstations or mini-computers. Computer 10 also preferably includes a graphical user interface that resides within a machine-readable media to direct the operation and user interface of computer 10. Computer 10 also can be implemented utilizing any suitable computer, such as the IBM RISC/6000 computer, also a product of International Business Machines Corporation, located in Armonk, N.Y. "RISC SYSTEM/6000" is a trademark of International Business Machines Corporation, and also can be referred to as the "RS/6000."

Figure 2:
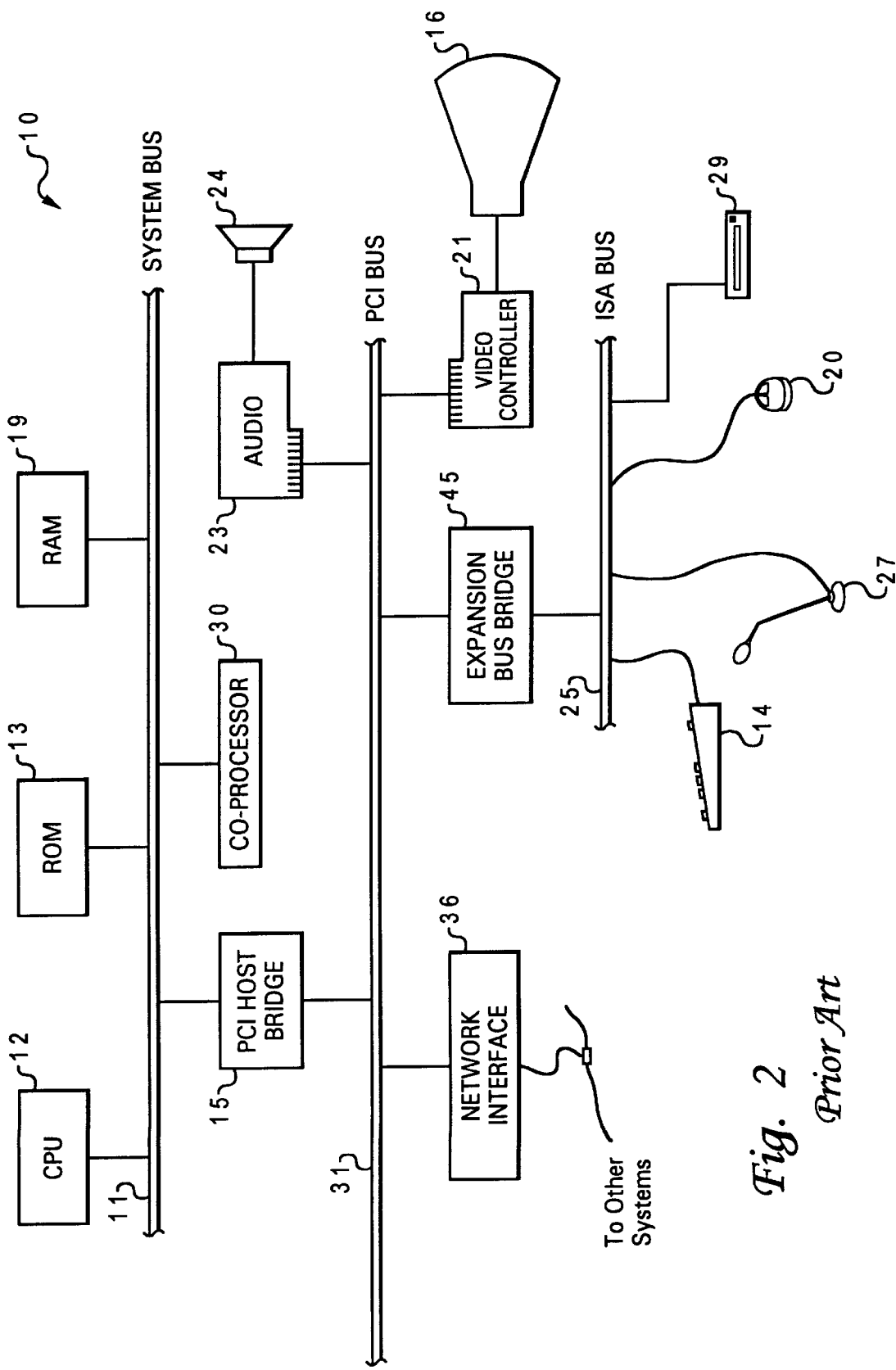
FIG. 2 depicts a block diagram illustrative of selected components of a data processing system or a personal computer system in accordance with the method and system of the present invention.

Referring now to FIG. 2, there is depicted a block diagram of selected components in accordance with computer 10 of FIG. 1. A preferred embodiment of the present invention may be implemented with the system architectures of FIG. 2. Computer 10 preferably includes a system bus 11. System bus 11 is utilized for interconnecting and establishing communication between various components within computer 10. Microprocessor or central processing unit (CPU) 12 is connected to system bus 11 and also may have numeric co-processor 30 connected to it. Read-only memory ("ROM") 13 and random-access memory ("RAM") 19 are also connected to system bus 11. ROM 13 is mapped into CPU 12 address space in the range from 640K to 1 megabyte. RAM 19 is attached to system bus 11 and contains system-configuration information. Any suitable machine-readable media may retain an application program, such as a graphical user interface, a browser within computer 10, such as RAM 19, ROM 13, a magnetic diskette, magnetic tape, or optical disk.

Also connected to system bus 11 is PCI host bridge 15 which couples system bus 11 to PCI bus 31. PCI host bridge 15 controls the flow of data between PCI bus 31 and various peripherals, adapters, and devices. Expansion bridge bus 45 controls the flow of data from PCI bus 31 to ISA bus 25. ISA bus 25 couples various I/O devices to computer 10. I/O devices include keyboard 14, mouse 20, disk drive 29 and microphone 27. Keyboard 14, mouse 20 and disk drive 29 typically have controllers (not shown) which are utilized to interface ISA bus 25. Video controller 21 provides a hardware interface for video display terminal 16. Audio controller 23 provides a hardware interface for speaker 24.

A network interface adapter 36 additionally can be connected to PCI bus 31 in order to link computer 10 to other data-processing system networks in a client/server architecture or to groups of computers and associated devices which are connected by communications facilities (not shown).

Figure 3:
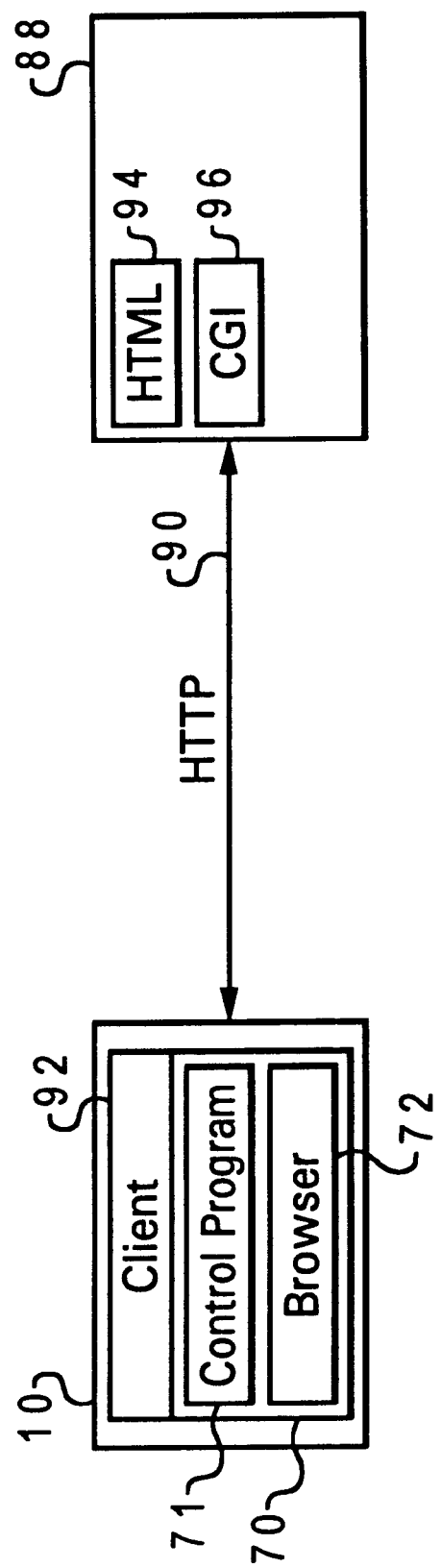
FIG. 3 is illustrative of a client server relationship which can be implemented in accordance with the method and system of the present invention.

FIG. 3 illustrates a block diagram illustrative of a client/server architecture which can be utilized in accordance with the method and system of the present invention. In FIG. 3, user requests for information are sent by client 92 via computer 10 in cooperation with an application program, such as browser 72 to server 88. Server 88 can be a remote computer system accessible over a communication line 90 or a remote network, such as the Internet. Server 88 performs scanning and searching of raw or unprocessed information sources, such as newswire feeds or newsgroups, and based upon these user requests, the server presents filtered electronic information as a server response over communication line 90 to the client process.

The client process may be active in a first computer system, and the server process may be active in a second computer system. The server process communicates with the first computer system over a communications medium, such as communication line 90 thus providing distributed functionality and allowing multiple clients to take advantage of the information gathering capabilities of a single server located miles away.

In a preferred embodiment, computer 10 and server 88 communicate utilizing the functionality provided by HTTP. Active within computer 10 is a first process, browser 72, which establishes the connections with server 88, and presents information to the user via a graphical user interface. Such browsers are often referred to in the art of computer networking as "web browsers." Any number of commercially or publicly available browsers may be utilized in accordance with a preferred embodiment of the present invention.

For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser™, Explorer™ or the Lynx-brand browsers which provide the functionality specified under HTTP can also be utilized with a preferred embodiment of the present invention.

Server 88 executes the corresponding server software which presents information to client software in the form of HTTP responses. HTTP responses correspond with "web pages," which can be represented by utilizing Hypertext Markup Language (HTML), or other data generated by server 88. For example, under the Mosaic-brand browser, in addition to HTML functionality 94 provided by server 88, a Common Gateway Interface (CGI) 96 is provided which allows the client program to direct server 88 to commence execution of a specified program contained within server 88. A client program may include a search engine which scans received information in server 88 for presentation to the user via client 92.

Utilizing HTTP responses, server 88 may notify a browser interface of client 92 of the results of an execution upon completion. Common Gateway Interface (CGI) 96 is one form of a "gateway," a device utilized to adapt data for utilization by dissimilar networks (i.e., networks utilizing different communication protocols), such that electronic information in different forms can be passed from one network to another. Gateways transfer electronic information, converting such information to a form compatible with the protocols utilized by a second network for transport and delivery.

Software application programs residing in main memory 70 are accessible by CPU 12 via system bus 11 of computer 10 described in FIG. 2. Applications in main memory include control program 71. Control program 71 contains instructions that when executed on a CPU carry out computations as a computer program product. The computer program product can also be referred to as a program product. Control program 71 can support a number of Internet-access tools including, for example, an HTTP-compliant web "browser." Known browser software applications include: Netscape Navigator® ("Netscape"), Mosaic™, Microsoft Explorer™, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Ill., and Explorer is available from Microsoft Corp. However, the present invention can be utilized with any web browser or any developing web browser.

Control program 71 can support other remote network services, such as a file-transfer protocol (FTP) service, which facilitates the transfer and sharing of files across remote networks, such as the Internet. Control program 71 can further support remote network services, such as remote terminal access (Telnet), which allows users to log onto computers coupled to the network. In addition, control program 71 can support services, such as simple mail-transfer protocol (SMTP), or e-mail, and network news-transfer protocol (NNTP) or "Usenet," all of these network services are well-known in the art of computer networking.

It is important to note that, while the present invention has been, and will continue to be described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include recordable-type media, such as floppy disks, hard-disk drives, audio CDs and CD ROMs, and transmission-type media, such as digital and analog communication links.

Those skilled in the art will appreciate that the hardware depicted in FIGS. 1 and 2 may vary for specific applications. For example, other peripheral devices, such as optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated by those having skill in the art that any configuration of the aforementioned system and any future, yet to be developed, configuration may be utilized to implement the present invention.

Figure 4:
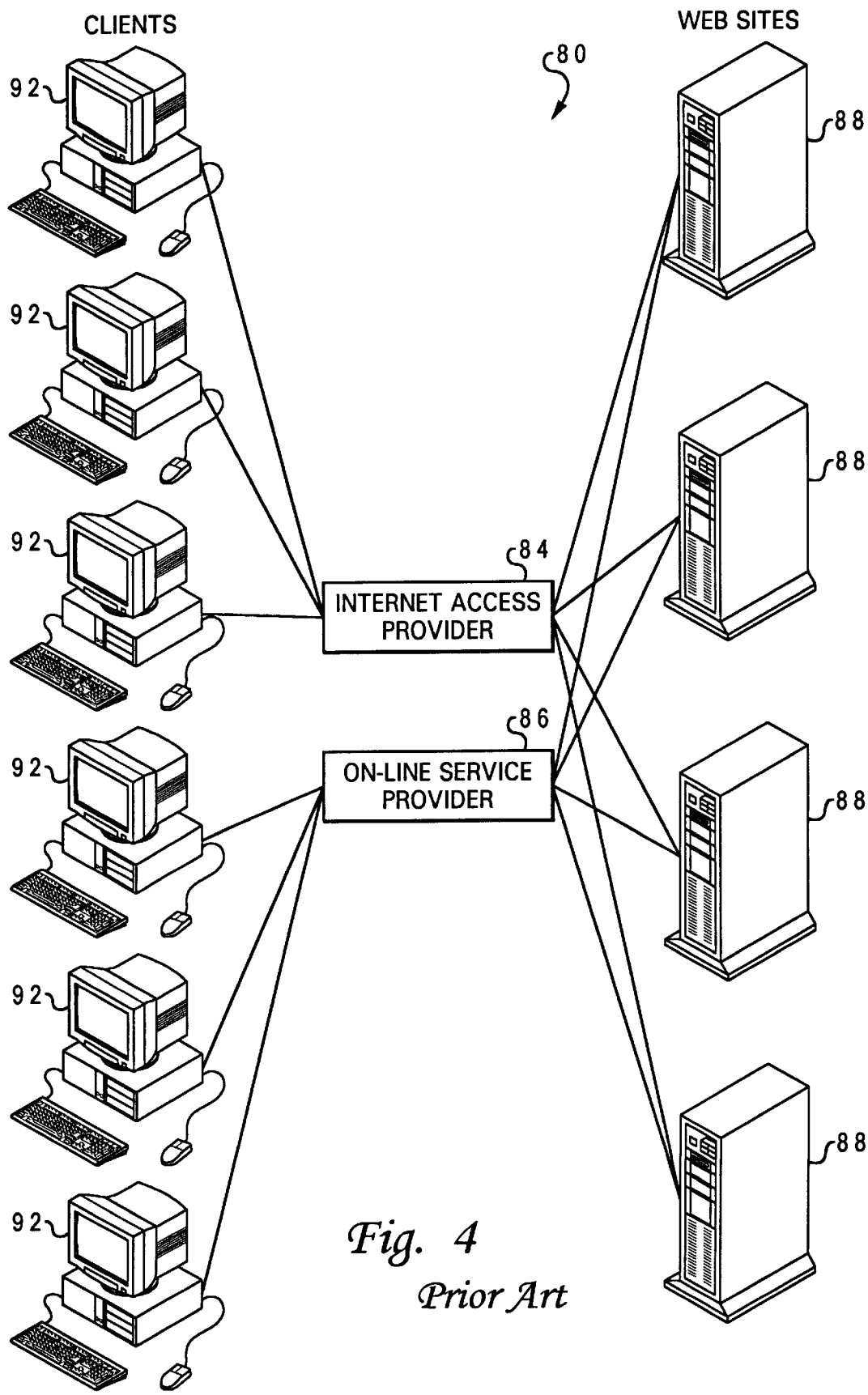
FIG. 4 depicts an Internet configuration in which an implementation of a method and system can be accomplished in accordance with the present invention.

Referring to FIG. 4 an illustration of a computer network 80 is depicted which can be implemented in accordance with the method and system of the present invention. In FIGS. 3 and 4 like parts are identified utilizing like reference numerals. Computer network 80 is representative of a remote network, specifically the Internet, a known computer network based on the client-server model discussed earlier. Conceptually, the Internet includes a large network of servers 88 which are accessible by users of personal computers or clients 92. Personal computers typically access a server via a private Internet access provider 84 (e.g., such as Internet America™) or an on-line service provider 86 (e.g., such as America On-Line™, Prodigy™, Compuserve™, and the like). Each client 92 may run a browser, a known software tool utilized to access server 88 via Internet access provider 84. Server 88 operates a web site which supports files in the form of documents and pages. A network path to server 88 is identified by a Universal Resource Locator (URL) having a known syntax for defining a network collection. Again, FIGS. 3 and 4 are merely illustrative and it can be appreciated by those having skill in the art that any working configuration or future configuration can be utilized to implement the present invention. New communication configurations or interconnect configurations will not part from the scope of the present invention.

Figure 5:
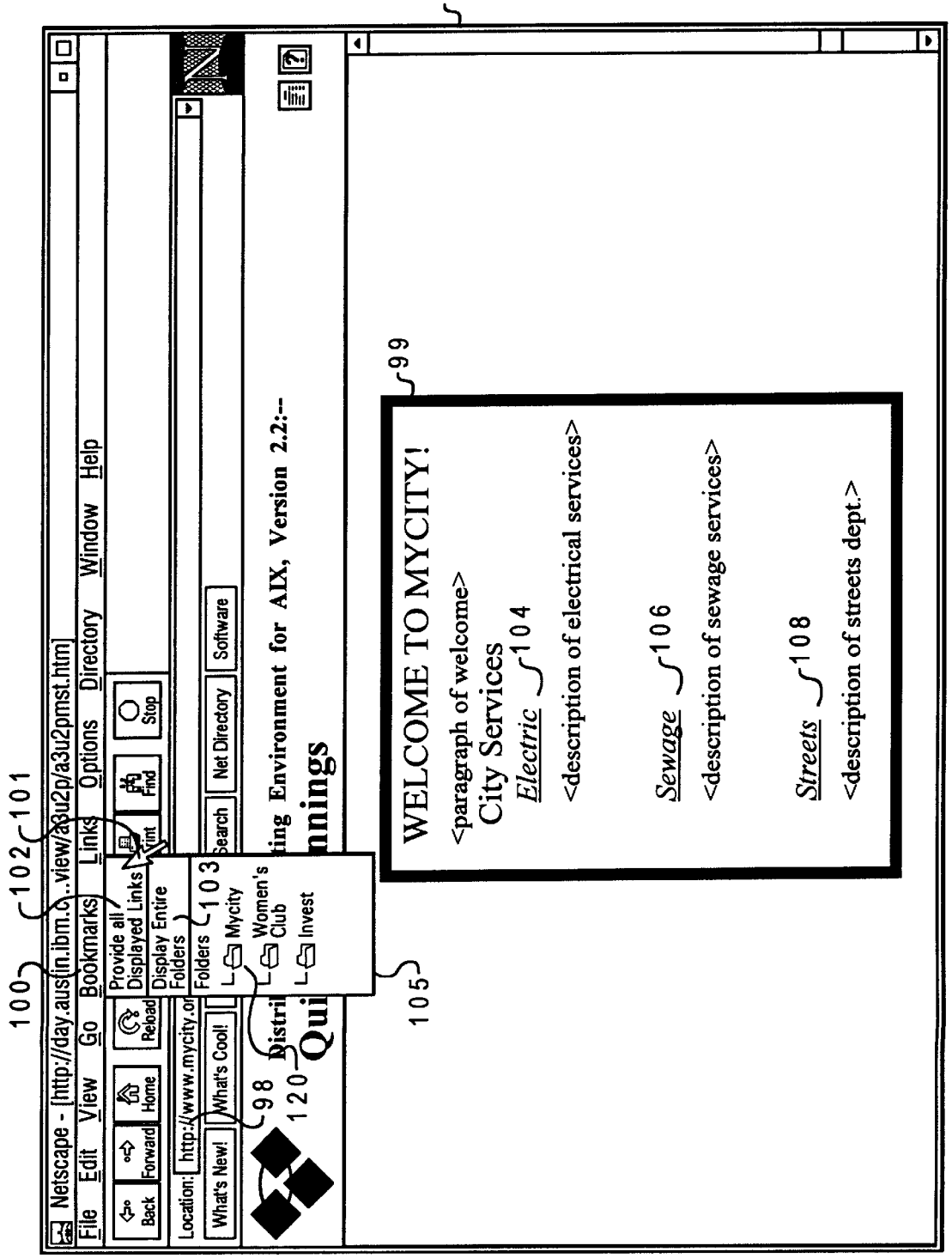
FIG. 5 illustrates a typical web page retrieved utilizing a computer network and selectable features for displaying multiple network locations concurrently.

Referring to FIG. 5 web page 99 is displayed on computer display 160. Web page 99 has a network address 98 indicating the network location from which the web page was retrieved. Network address 98 typically appears at the top of a display screen. FIG. 5 illustrates the selection of "bookmarks" menu heading 100 utilizing pointing device 103. Pulldown menu 105 displays selections which will automatically display multiple web pages concurrently originating from a single user input.

Links to other web pages such as electric link 104, sewage link 106 and streets link 108 are illustrated on web page 99. Selection of the links will display data from the network location associated with the link. Pulldown menu 105 is depicted having the selection "provide all displayed links" 102. Selecting provide all displayed links 102 will allow a predetermining group of web pages to be displayed concurrently. In the depicted example, selection of provide all displayed links 102 retrieves and concurrently displays the web pages of electric link 104, sewage link 106 and streets link 108.

Typically, when utilizing a network browser a user bookmarks network locations which are frequently visited. Additionally, network locations are bookmarked when a return visit to the network location is anticipated by the user.

A typical browser allows a user to group or categorize network addresses in folders. Folders allow quick access to the categorized network addresses. Within pulldown menu 105, my city folder 120 is displayed. When my city folder 120 is highlighted, a user selection of display entire folder 101 will display all web sites concurrently which reside in my city folder 120.

Figure 6:
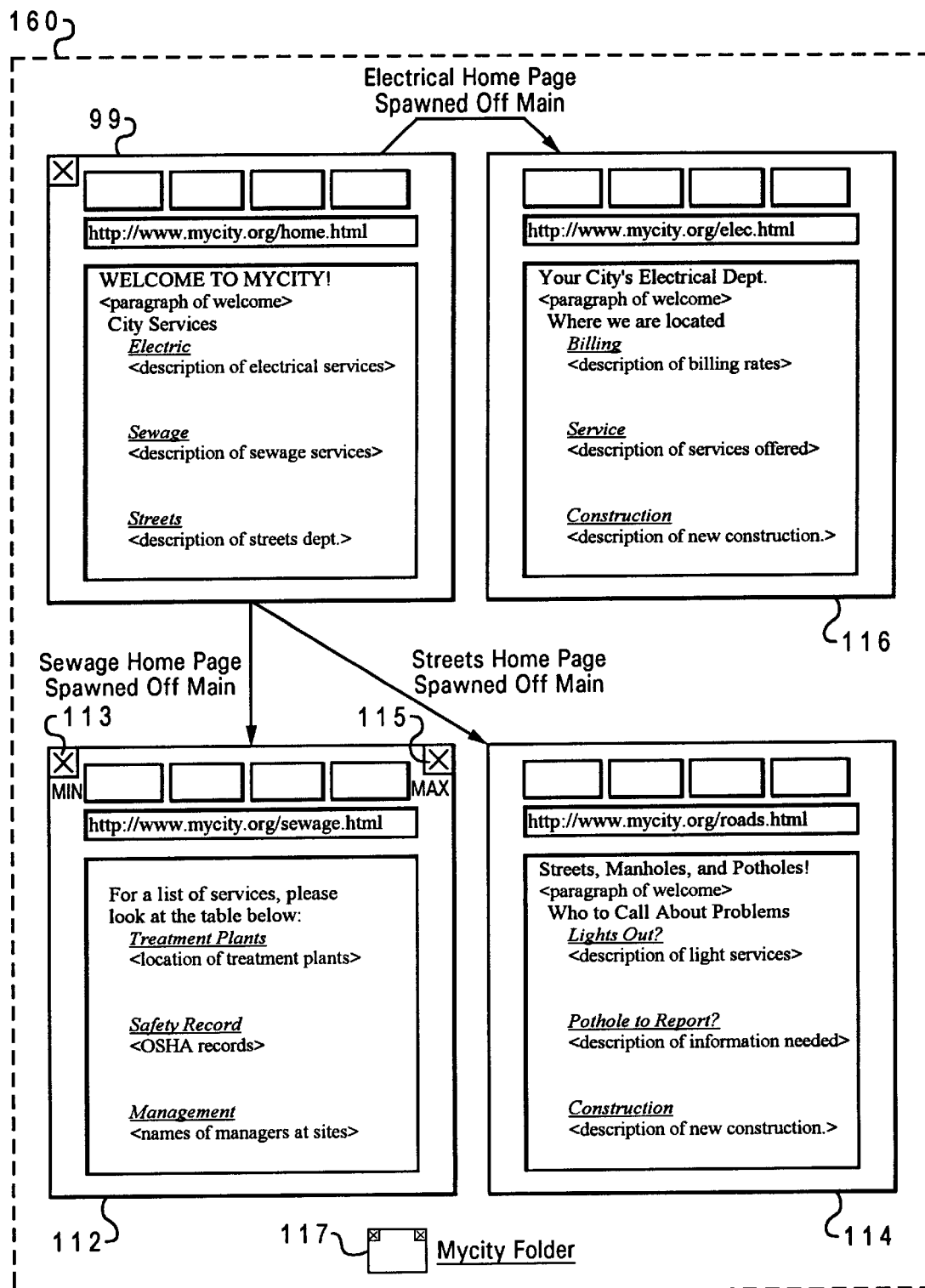
FIG. 6 depicts a response to selection of a predetermining group of web pages in accordance with the present invention.

Referring now to FIG. 6, linked web pages are displayed in response to the user selection of provide all displayed links 102 of FIG. 5. All linked web pages displayed in FIG. 5, or a predetermined group of web pages, are viewable concurrently on computer display 160 in response to the selection illustrated in FIG. 5. The initially selected web page 99 is depicted in the upper left hand corner of computer display 160. Electric link 104 of FIG. 5 and its corresponding text are displayed in first enclosed area 116. Data corresponding to sewage link 106 is displayed within second enclosed area 112 and the web page corresponding to streets link 108 is displayed in enclosed area 114. As illustrated, each link can be concurrently displayed in response to selection provide all displayed links 102 of FIG. 5.

In one embodiment of the present invention, independent browser application programs are started for each displayed link. However, a single browser application could be utilized to display the predetermining group of web pages 118, as depicted in FIG. 8, for example. Minimize selectable button 113 is illustrated within second enclosed area 112. Selecting minimize would shrink second enclosed area 112 to the size of minimized web page 117. Maximize selectable button 115 is illustrated within second enclosed enclosure 112. Selection of maximize would expand enclosed area to cover the entire display screen. The minimize and maximize features allows a user to expand and shrink the area in which retrieved web pages are displayed.

Figure 7:
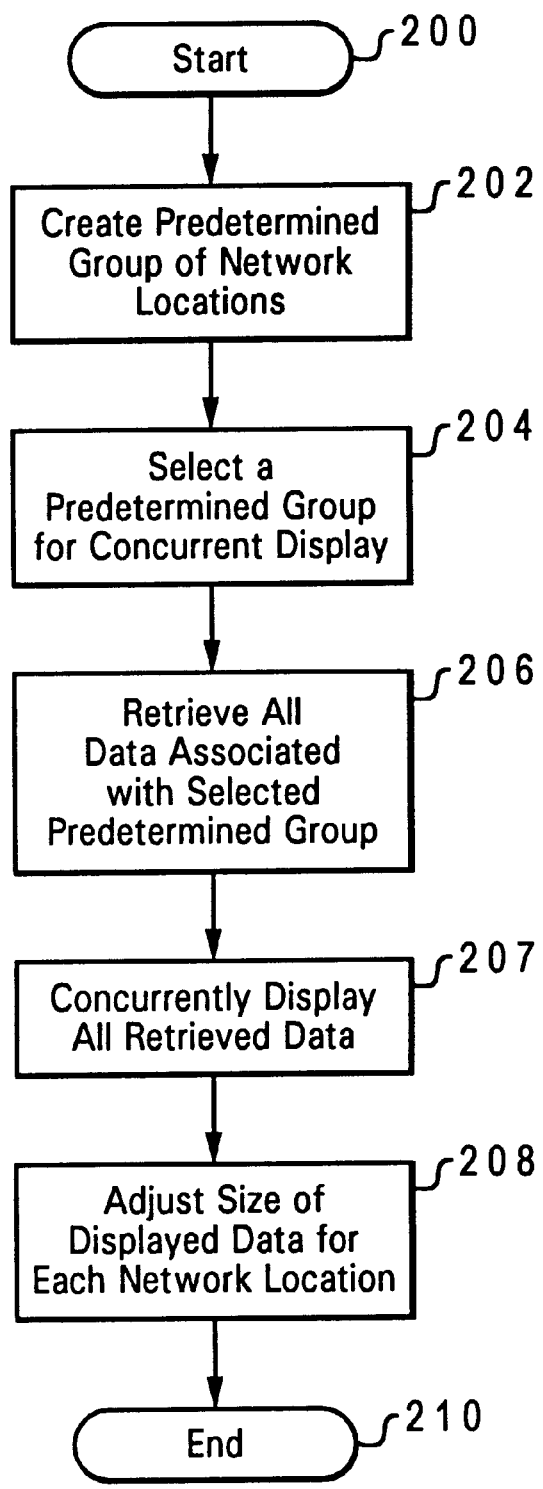
FIG. 7 illustrates a high level flow diagram of a preferred method in accordance with the present invention.

Referring now to FIG. 7, a high level flow diagram in accordance with the present invention is depicted. The process begins at block 200 and thereafter proceeds to block 202. Block 202 illustrates assigning a plurality of web pages to a predetermining group. The predetermined group can be defined by links on web pages or sublinks which are located on linked web pages. Alternately, the predetermined group of network location could be created by a user in the bookmark pulldown menu within folders. Placing network locations into folders is a process which is well known by those having skill in the art. Next, as illustrated in block 204 a user would select all web pages in the predetermined group for contemporaneous display. Then, as depicted in block 206 the data processing system retrieves data associated with all network locations in the predetermined group. Next, as illustrated in block 207 all retrieved selected network locations in the predetermined group are displayed. As illustrated in block 208, the user is then allowed to alter the screen size of the displayed sub windows containing web pages. The process then ends as depicted at block 210.

While the invention has been particularly shown and described with reference to a preferred embodiment, it will be understood by those skilled in the art that various changes in form and detail may be made therein without departing from the spirit and scope of the invention.

What is claimed is:

1. A method for retrieving and contemporaneously displaying multiple subordinate documents at a data processing system, based on links in a current document, said method comprising:

retrieving a current document that includes a plurality of hyperlinks identifying a plurality of respective subordinate documents;

displaying said current document;

receiving user input selecting a function for simultaneously displaying multiple subordinate documents;

automatically examining said current document to extract at least two hyperlinks among said plurality of hyperlinks;

in response to said user input, automatically utilizing said at least two extracted hyperlinks to retrieve at least two respective subordinate documents among said plurality of respective subordinate documents; and in response to retrieving said at least two respective subordinate documents, automatically contemporaneously displaying said at least two respective subordinate documents.

2. The method of claim 1, further including the step of adjusting the size of the display area for each of said at least two respective subordinate documents, based on a total number of said at least two respective subordinate documents to be displayed contemporaneously.

3. The method of claim 1, further including the step of utilizing a single browser window for displaying said current document and said at least two respective subordinate documents.

4. The method of claim 3, further including the step of visually separating said at least two respective subordinate documents.

5. The method of claim 1, wherein said step of contemporaneously displaying said at least two respective subordinate documents comprises utilizing an independent browser window to display each of said at least two respective subordinate documents.

6. The method of claim 1, wherein:

said step of automatically examining said current document to extract at least two hyperlinks is performed automatically in response to said user input.

7. A data processing system comprising:

means for retrieving a current document that includes a plurality of hyperlinks identifying a plurality of respective subordinate documents;

means for displaying said current document;

means for receiving user input selecting a function for simultaneously displaying multiple subordinate documents;

means for automatically examining said current document to extract at least two hyperlinks among said plurality of hyperlinks;

means, responsive to said user input, for automatically utilizing said at least two extracted hyperlinks to retrieve at least two respective subordinate documents among said plurality of subordinate documents; and means, responsive to retrieving said at least two respective subordinate documents, for automatically contemporaneously displaying said at least two respective subordinate documents.

8. The data processing system of claim 7, further including means for adjusting the size of the display area for each of said at least two respective subordinate documents, based on a total number of said at least two respective subordinate documents to be displayed contemporaneously.

9. The data processing system of claim 7, wherein said means for automatically contemporaneously displaying said at least two respective subordinate documents comprises a single browser window.

10. The data processing system of claim 9, wherein said means for automatically contemporaneously displaying said at least two respective subordinate documents comprises means for visually separating said at least two respective subordinate documents.

11. The data processing system of claim 7, wherein said means for contemporaneously displaying said at least two respective subordinate documents comprises two or more respective independent browser windows.

12. The data processing system of claim 7, wherein:

said means for automatically examining said current document to extract at least two hyperlinks operates automatically in response to said user input.

13. A program product for retrieving and contemporaneously displaying multiple subordinate documents at a data processing system, based on links in a current document, said program product comprising:

means for retrieving a current document that includes a plurality of hyperlinks identifying a plurality of respective subordinate documents;

means for displaying said current document;

means for receiving user input selecting a function for simultaneously displaying multiple subordinate documents;

means for automatically examining said current document to extract at least two hyperlinks among said plurality of hyperlinks;

means, responsive to said user input, for automatically utilizing said at least two extracted hyperlinks to retrieve at least two respective subordinate documents among said plurality of respective subordinate documents;

means, responsive to retrieving said at least two respective subordinate documents, for automatically contemporaneously displaying said at least two respective subordinate documents; and a computer usable medium encoding said means for retrieving, said means for displaying, said means for receiving, said means for automatically examining, said means for automatically utilizing, and said means for automatically contemporaneously displaying.

14. The program product of claim 13, wherein said means for automatically contemporaneously displaying said at least two respective subordinate documents comprises means for adjusting the size of the display area for each of said at least two respective subordinate documents, based on a total number of said at least two respective subordinate documents to be displayed contemporaneously.

15. The program product of claim 13, wherein said means for automatically contemporaneously displaying said at least two respective subordinate documents comprises a single browser window.

16. The program product of claim 15, wherein said means for automatically contemporaneously displaying said at least two respective subordinate documents comprises means for visually separating said at least two respective subordinate documents.

17. The program product of claim 13, wherein said means for contemporaneously displaying said at least two respective subordinate documents comprises two or more respective independent browser windows.

18. The program product of claim 13, wherein:

said means for automatically examining said current document to extract at least two hyperlinks operates automatically in response to said user input.

* * * * *